UNITED STATES PATENT OFFICE.

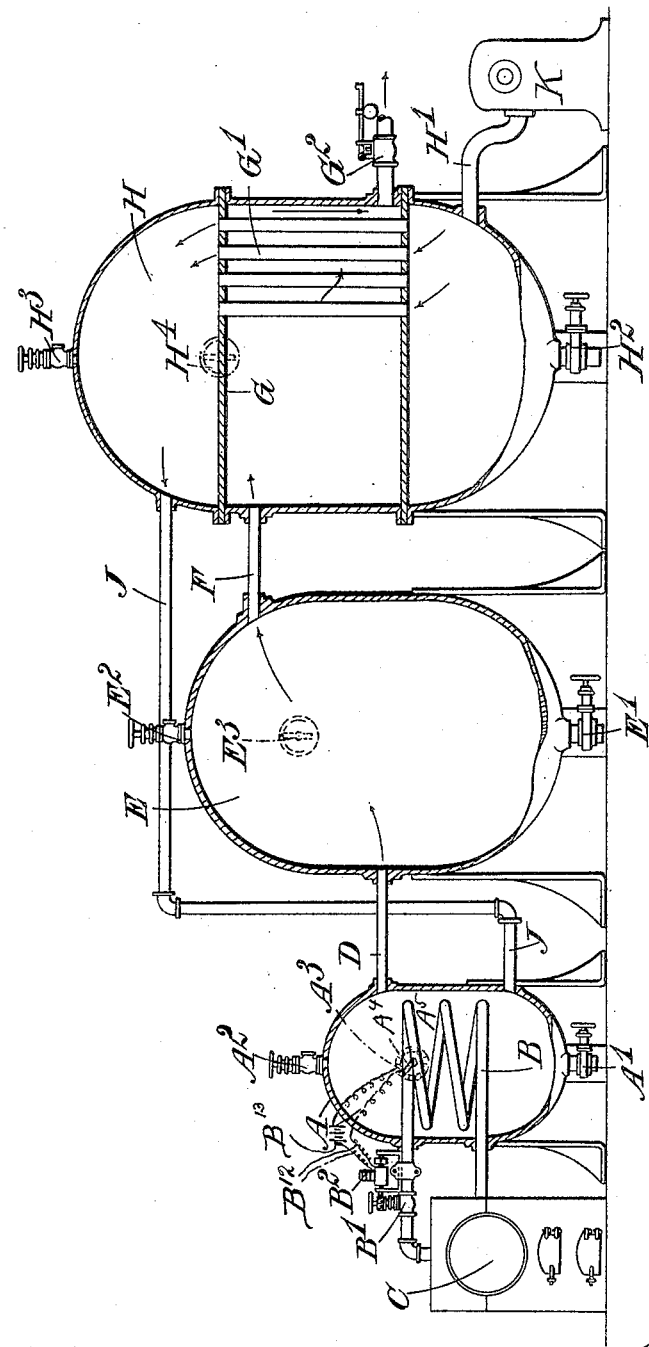

CHARLES TUCKFIELD, OF EAST MOLESEY, ENGLAND.

LIQUID-PURIFIER.

No. 821,207.  Specification of Letters Patent.  Patented May 22, 1906.

Application filed September 23, 1903. Serial No. 174,353.

*To all whom it may concern:*

Be it known that I, CHARLES TUCKFIELD, a subject of the King of England, and a resident of East Molesey, county of Surrey, England, have invented certain new and useful Improvements in Liquid-Purifiers, of which the following is a specification.

This invention relates to purifying liquids and separating matter therefrom, its primary object being the construction of apparatus whereby water can be softened and sterilized and the matter contained in it concentrated at a small cost. The water so obtained is suitable for use for domestic and general purposes or for boilers, &c., and the separated matter—such, for example, as metallic salts, mineral or organic matter, &c.—can be utilized in any convenient way.

According to this invention the liquid is heated under pressure to a temperature above boiling-point in a vessel which is kept filled with it and the separated matter is removed from the vessel during the operation of the apparatus—that is, while the temperature and pressure are at their normal working-points.

The apparatus conveniently comprises a series of vessels which intercommunicate and are filled with the liquid under pressure. In on of these vessels the liquid is heated, say, by means of steam to a temperature above boiling-point—to about 300° Fahrenheit, for example—but the degree of heat is regulated according to the nature of the liquid treated—that is, of the matter contained in and to be separated from it. This sterilizes the liquid and causes it to deposit some of the solid matter. From the upper part of this heating vessel the liquid passes to a settling vessel and from thence to a third vessel, where it passes out through a coil or a series of tubes and gives up its heat to the incoming impure liquid. This impure liquid passes from the top of the third heat-exchanging vessel to the lower part of the heating vessel.

All the vessels are preferably well lagged, and it is only necessary to supply fresh heat to the heating vessel to compensate for the losses by radiation, blowing off, &c.

The separated matter is removed during the working of the apparatus, say, by suitably-placed blow-off cocks and scum-cocks.

The accompanying drawing illustrates diagrammatically one construction of apparatus according to this invention.

A is the heating vessel or cylinder containing a coil of pipe B, through which steam can be passed from a steam-generator C to heat the contents of the vessel A.

From the upper portion of the heating vessel A a pipe D leads into a settling vessel E, which in turn communicates, by means of a pipe F, with a chamber or drum G within a heat-exchanging vessel H. This chamber G is provided with a number of tubes $G'$, through which the incoming impure liquid forced in by any suitable means—for example, a pump K—at the inlet $H'$ at the bottom of the vessel H can pass to the upper part of that vessel. A pipe J connects the upper portion of the vessel H with the lower part of the heating vessel A. The vessel A is provided with a blow-off cock $A'$, through which the solid matter may pass, and similar cocks $E'$ and $H^2$ are provided for the vessels E and H, respectively. The three vessels are also furnished with scum-cocks, which are marked $A^2$, $E^2$, and $H^3$, respectively.

The heating vessel A is provided with a thermometer or temperature-indicator, as at $A^3$, and this is preferably arranged so that its movements control the valve $B'$, regulating the admission of steam from the generator C to the pipe B. This may be conveniently accomplished electromagnetically. For instance, the movement of the indicator $A^3$ may start and stop a small electric motor, which is indicated at $B^2$. The details of this arrangement, however, form no part of the present invention and may be of any usual construction. For example, the spindle of the indicator $A^3$ may carry a switch-arm $A^4$ and cause it to move over the contacts of a motor starting and stopping switch $A^5$ in circuit with the motor $B^2$ and battery $B^{13}$ or other source of current by wires $B^{12}$. Temperature-indicators are also provided for the vessels E and H at $E^3$ and $H^4$, and liquid-gages and other fittings may be attached to the vessels, but are not shown in the drawing.

The chamber G is provided near its lower part with a loaded outlet-valve $G^2$.

The operation of the apparatus is as follows: Normally all three vessels A, E, and H are quite full of liquid, which is forced in impure at $H'$ and leaves purified at $G^2$. Superheated steam being admitted into the pipe B, the contents of the heating vessel A are raised to a temperature above the boiling-point—say in the case of water to about 300° Fahrenheit. The liquid expands and is sterilized and deposits some of its solid matter in the vessel A. It then passes through the pipe D into the settling vessel E. Here the greater portion of the solid matter is deposited, and the purified liquid passes through the pipe F and into the upper portion of the chamber G. As it flows down round the tubes G' to the outlet G² the hot purified liquid gives up its heat to the incoming impure liquid which is forced up through the inside of the tubes G' and out through the pipe J to the heating vessel A. The loaded outlet-valve G² and the pressure of the incoming fluid at the inlet H' are so regulated that the vessels are kept quite full of the liquid, which passes through them continuously. The separated matter is removed by the blow-off cocks or scum-cocks, while the temperature and pressure are at their working values.

In order to reduce radiation losses to a minimum, all those vessels are preferably thoroughly lagged; but this lagging is not illustrated in the drawing, as it forms no part of the present invention, and owing to the fact that the purified liquid in the heat-exchanging vessel H parts with most of its heat to the impure liquid it is found that a comparatively small amount of steam need be used in the heating vessel A to compensate for the loss by radiation, &c. Thus the process is a very economical one, it being possible to purify large quantities of liquid and obtain a considerable amount of separated matter at a very small outlay.

What I claim as my invention, and desire to secure by Letters Patent, is—

1. In apparatus for purifying liquids and separating matter therefrom, the combination of a vessel adapted to contain liquid under pressure, a second vessel, a conduit leading from the upper part of the first vessel to the second one, a third vessel, a chamber within such vessel, a conduit leading from the upper part of the second vessel to the inside of said chamber, tubes passing through the chamber, another conduit leading from the upper part of the third vessel to the lower part of the first one, an inlet at the lower part of the third vessel, a pressure-cock serving as an outlet to the chamber, means for forcing liquid through the inlet and causing it to fill the vessels and pass through the outlet, a steam-coil in the first vessel to raise its contents to a temperature above boiling-point, and blow-off cocks and scum-cocks for withdrawing the separated liquid and semisolid matter during the operation of the apparatus substantially as set forth.

2. In apparatus for purifying liquids and separating matter therefrom, the combination of a vessel adapted to contain liquid under pressure, a second vessel, a conduit leading from the upper part of the first vessel to the second one, a third vessel, a chamber within such vessel, a conduit leading from the upper part of the second vessel to the inside of said chamber, tubes passing through the chamber, another conduit leading from the upper part of the third vessel to the lower part of the first one, an inlet at the lower part of the third vessel, a pressure-cock serving as an outlet to the chamber, means for forcing liquid through the inlet and causing it to fill the vessels and pass through the outlet, a steam-coil in the first vessel to raise its contents to a temperature above boiling-point, electrically-operating means for automatically controlling the steam-supply to said coil, and blow-off cocks and scum-cocks for withdrawing the separated liquid and semisolid matter during the operation of the apparatus substantially as set forth.

In testimony whereof I have signed my name to this specification in the presence of two subscribing witnesses.

CHARLES TUCKFIELD.

Witnesses:
 HAROLD WADE,
 HARRY B. HODGE.